(12) United States Patent
Hamlyn et al.

(10) Patent No.: US 10,821,682 B2
(45) Date of Patent: Nov. 3, 2020

(54) FIBER APPLICATION MACHINE COMPRISING SPECIFIC CUTTING SYSTEMS

(71) Applicant: CORIOLIS GROUP, Quéven (FR)

(72) Inventors: Alexander Hamlyn, Ploemeur (FR); Loïc Gaillard, Lannester (FR)

(73) Assignee: CORIOLIS GROUP, Queven (FR)

( * ) Notice: Subject to any disclaimer, the term of this patent is extended or adjusted under 35 U.S.C. 154(b) by 0 days.

(21) Appl. No.: 15/772,491

(22) PCT Filed: Oct. 13, 2016

(86) PCT No.: PCT/FR2016/000165
§ 371 (c)(1),
(2) Date: Apr. 30, 2018

(87) PCT Pub. No.: WO2017/072421
PCT Pub. Date: May 4, 2017

(65) Prior Publication Data
US 2019/0077094 A1    Mar. 14, 2019

(30) Foreign Application Priority Data
Oct. 28, 2015    (FR) ..................................... 15 02281

(51) Int. Cl.
*B29C 70/38*    (2006.01)
*B29C 70/54*    (2006.01)
(Continued)

(52) U.S. Cl.
CPC ............ *B29C 70/384* (2013.01); *B26D 1/025* (2013.01); *B26D 1/065* (2013.01); *B26D 5/12* (2013.01);
(Continued)

(58) Field of Classification Search
CPC ................. B29C 70/384; B29C 70/545; Y10T 156/1317; Y10T 156/1322
See application file for complete search history.

(56) References Cited

U.S. PATENT DOCUMENTS

| 494,910 A | 4/1893 | Wells |
| 1,100,829 A | 6/1914 | Joseph |

(Continued)

FOREIGN PATENT DOCUMENTS

| DE | 1 922 327 U | 8/1965 |
| DE | 37 43 485 | 7/1989 |

(Continued)

OTHER PUBLICATIONS

Written Opinion for PCT Application No. PCT/FR2016/000043, dated Jul. 19, 2016, 12 pages.

(Continued)

*Primary Examiner* — Mark A Osele
*Assistant Examiner* — Christopher C Caillouet
(74) *Attorney, Agent, or Firm* — Patterson Thuente Pedersen, P.A.

(57) ABSTRACT

A machine for producing parts made of composite material, the machine comprising a fiber-application head comprising an application roller, a guide system for guiding one or more fibers, in the form of a strip, towards said application roller, and at least one cutting system comprising a blade capable of being maneuvered by a cutting cylinder between a rest position and an active position for cutting a fiber, each cutting system comprising a counter-blade that is elastically held against the blade by the cutting edge thereof for cutting by shearing a fiber while the blade moves from the rest position thereof to the active position thereof.

8 Claims, 8 Drawing Sheets

(51) Int. Cl.
*B26D 1/02* (2006.01)
*B26D 1/06* (2006.01)
*B26D 5/12* (2006.01)
B26D 1/00 (2006.01)
B26D 1/08 (2006.01)

(52) U.S. Cl.
CPC ............ B29C 70/545 (2013.01); *B26D 1/085* (2013.01); *B26D 2001/0066* (2013.01)

(56) References Cited

U.S. PATENT DOCUMENTS

| | | |
|---|---|---|
| 1,164,303 A | 12/1915 | Nicewarner |
| 1,301,354 A | 4/1919 | Baird |
| 3,206,429 A | 9/1965 | Broyles et al. |
| 3,207,019 A * | 9/1965 | Vanzo .................. B26D 1/04 83/277 |
| 3,238,084 A | 3/1966 | Hawkins |
| 3,265,795 A | 8/1966 | Medney |
| 3,300,355 A | 1/1967 | Adams |
| 3,563,122 A | 2/1971 | De Neui |
| 3,662,821 A | 5/1972 | Saxon |
| 3,692,601 A | 9/1972 | Goldsworthy et al. |
| 3,713,572 A | 1/1973 | Goldsworthy et al. |
| 3,856,052 A | 12/1974 | Feucht |
| 3,904,142 A * | 9/1975 | Corse ................. B65H 19/1821 242/554.6 |
| 4,118,814 A | 10/1978 | Holtom |
| 4,234,374 A | 11/1980 | Frank |
| 4,242,160 A | 12/1980 | Pinter et al. |
| 4,259,144 A | 3/1981 | Ballentine |
| 4,351,588 A | 9/1982 | Weiss et al. |
| 4,461,669 A | 7/1984 | Dontscheff |
| 4,488,466 A | 12/1984 | Jones |
| 4,562,033 A | 12/1985 | Johnson et al. |
| 4,569,716 A | 2/1986 | Pugh |
| 4,574,029 A | 3/1986 | Murray |
| 4,699,031 A | 10/1987 | D'Angelo et al. |
| 4,707,212 A | 11/1987 | Hailey et al. |
| 4,714,509 A | 12/1987 | Gruber |
| 4,717,330 A | 1/1988 | Sarh |
| 4,735,672 A | 4/1988 | Blad |
| 4,849,150 A | 7/1989 | Kittaka et al. |
| 4,881,998 A | 11/1989 | Youngkeit |
| 4,976,012 A | 12/1990 | McConnell |
| 4,990,213 A | 2/1991 | Brown et al. |
| 4,992,133 A | 2/1991 | Border |
| 4,997,513 A | 3/1991 | Lengen et al. |
| 5,015,326 A | 5/1991 | Frank |
| 5,078,592 A | 1/1992 | Grimshaw et al. |
| 5,087,187 A | 2/1992 | Simkulak et al. |
| 5,110,395 A | 5/1992 | Vaniglia |
| 5,200,018 A | 4/1993 | Gill et al. |
| 5,290,389 A | 3/1994 | Shupe et al. |
| 5,397,523 A | 3/1995 | Curry |
| 5,447,586 A | 9/1995 | Tam |
| 5,587,041 A | 12/1996 | Sandusky et al. |
| 5,645,677 A | 7/1997 | Cahuzac et al. |
| 5,700,347 A | 12/1997 | McCowin |
| 5,766,357 A | 6/1998 | Packer et al. |
| 5,979,531 A | 11/1999 | Barr et al. |
| 6,026,883 A | 2/2000 | Hegerhorst et al. |
| 6,073,670 A | 6/2000 | Koury et al. |
| 6,096,164 A | 8/2000 | Benson et al. |
| 6,251,185 B1 | 6/2001 | Morrison et al. |
| 6,256,889 B1 | 7/2001 | Zuro |
| 6,451,152 B1 | 9/2002 | Holmes et al. |
| 6,458,309 B1 | 10/2002 | Allen et al. |
| 6,490,990 B1 | 12/2002 | Hamlyn et al. |
| 6,540,000 B1 | 4/2003 | Darrieux et al. |
| 6,605,171 B1 | 8/2003 | Debalme et al. |
| 6,808,378 B2 | 10/2004 | Wirth et al. |
| 7,048,024 B2 | 5/2006 | Clark et al. |
| 7,387,147 B2 | 6/2008 | Johnson et al. |
| 7,819,160 B2 | 10/2010 | Hamlyn et al. |
| 7,926,537 B2 | 4/2011 | Hamlyn et al. |
| 8,052,819 B2 | 11/2011 | Munaux et al. |
| 8,057,618 B2 | 11/2011 | Hamlyn |
| 8,191,596 B2 | 6/2012 | Hamlyn et al. |
| 8,667,999 B2 | 3/2014 | Hamlyn et al. |
| 8,733,417 B2 | 5/2014 | Hamlyn et al. |
| 9,144,945 B2 | 9/2015 | Caffiau et al. |
| 2002/0014715 A1 | 2/2002 | Wirth et al. |
| 2002/0090408 A1 | 7/2002 | Dahl et al. |
| 2002/0152860 A1 | 10/2002 | Machamer |
| 2003/0118681 A1 | 6/2003 | Dahl |
| 2004/0031879 A1 | 2/2004 | Kay et al. |
| 2004/0079838 A1 | 4/2004 | Simpson et al. |
| 2004/0103948 A1 | 6/2004 | Scheelen et al. |
| 2005/0023414 A1 | 2/2005 | Braun |
| 2005/0037195 A1 | 2/2005 | Warek |
| 2005/0039844 A1 | 2/2005 | Engwall et al. |
| 2005/0061422 A1 | 3/2005 | Martin |
| 2005/0236735 A1 | 10/2005 | Oldani et al. |
| 2006/0127635 A1 | 6/2006 | Colson et al. |
| 2006/0162143 A1 | 7/2006 | Nelson et al. |
| 2006/0169118 A1 | 8/2006 | Morehead |
| 2006/0180264 A1 | 8/2006 | Kisch et al. |
| 2006/0231682 A1 | 10/2006 | Sarh |
| 2007/0044919 A1 | 3/2007 | Hoffmann |
| 2007/0044922 A1 | 3/2007 | Mischler et al. |
| 2008/0093026 A1 | 4/2008 | Naumann |
| 2008/0105785 A1 | 5/2008 | Griess et al. |
| 2008/0157437 A1 | 7/2008 | Nelson et al. |
| 2008/0196806 A1 | 8/2008 | Hamlyn |
| 2008/0202691 A1 | 8/2008 | Hamlyn et al. |
| 2008/0216963 A1 | 9/2008 | Hamlyn et al. |
| 2009/0064508 A1 * | 3/2009 | Masseilot ............ B24D 15/084 30/350 |
| 2009/0139654 A1 | 6/2009 | Wampler et al. |
| 2009/0229760 A1 | 9/2009 | Hamlyn et al. |
| 2009/0311506 A1 | 12/2009 | Herbeck et al. |
| 2010/0252183 A1 | 10/2010 | Munaux et al. |
| 2011/0011537 A1 | 1/2011 | Hamlyn et al. |
| 2011/0011538 A1 | 1/2011 | Hamlyn et al. |
| 2014/0165337 A1 | 6/2014 | De Mattia |
| 2014/0259630 A1 * | 9/2014 | Johnson ................ B29C 70/545 29/566.1 |
| 2016/0059498 A1 | 3/2016 | Graf |
| 2016/0114540 A1 | 4/2016 | Hamlyn et al. |
| 2018/0093433 A1 | 4/2018 | Treiber et al. |
| 2018/0111341 A1 | 4/2018 | Leborgne |
| 2019/0118410 A1 | 4/2019 | Caffiau et al. |

FOREIGN PATENT DOCUMENTS

| | | |
|---|---|---|
| DE | 10 2007 009 124 A1 | 8/2008 |
| DE | 10 2012 007439 A1 | 10/2013 |
| EP | 0116137 A1 | 8/1984 |
| EP | 0 216 695 A1 | 4/1987 |
| EP | 0 241 251 A1 | 10/1987 |
| EP | 0 452 186 A1 | 10/1991 |
| EP | 0 546 001 A1 | 6/1993 |
| EP | 0 555 134 A1 | 8/1993 |
| EP | 0 557 158 A1 | 8/1993 |
| EP | 0 626 252 | 11/1994 |
| EP | 0 695 823 A2 | 2/1996 |
| EP | 0 697 990 | 2/1996 |
| EP | 0 753 394 A2 | 1/1997 |
| EP | 0 773 099 A1 | 5/1997 |
| EP | 1 001 066 A2 | 5/2000 |
| EP | 1177871 A2 | 2/2002 |
| EP | 1 342 555 A1 | 9/2003 |
| EP | 1 757 552 A2 | 2/2007 |
| FR | 1 590 718 | 5/1970 |
| FR | 2 050 498 | 4/1971 |
| FR | 2 254 428 | 7/1975 |
| FR | 2 624 786 A1 | 6/1989 |
| FR | 2 686 080 A1 | 7/1993 |
| FR | 2 721 548 | 12/1995 |
| FR | 2 784 930 A1 | 4/2000 |
| FR | 3 006 938 A1 | 12/2004 |
| FR | 2 865 156 | 7/2005 |
| FR | 2 882 681 A1 | 9/2006 |

(56) References Cited

FOREIGN PATENT DOCUMENTS

| FR | 2882681 A1 | 9/2006 |
|---|---|---|
| FR | 2912953 A1 | 8/2008 |
| FR | 2 913 365 A1 | 9/2008 |
| FR | 2 948 058 A1 | 1/2011 |
| FR | 2982793 A1 | 5/2013 |
| FR | 2 999 973 | 6/2014 |
| FR | 3 016 827 A1 | 7/2015 |
| GB | 2 268 705 A | 1/1994 |
| GB | 2 270 672 A | 3/1994 |
| GB | 2 292 365 A | 2/1996 |
| JP | 01 281247 | 11/1989 |
| JP | 2005-007252 | 1/2005 |
| JP | 2005329593 | 12/2005 |
| WO | WO 88/10154 A1 | 12/1988 |
| WO | WO 92/04492 A1 | 3/1992 |
| WO | WO 95/20104 | 7/1995 |
| WO | WO 02/070232 | 9/2002 |
| WO | WO 03/035380 A1 | 5/2003 |
| WO | WO 2006/060270 A1 | 6/2006 |
| WO | WO 2006/092514 A2 | 9/2006 |
| WO | WO 2008/122709 A1 | 10/2008 |
| WO | WO 2008/132299 A2 | 11/2008 |
| WO | WO 2008/149004 A1 | 12/2008 |
| WO | WO 2009/0181805 A1 | 7/2009 |
| WO | WO 2010/049424 A1 | 5/2010 |
| WO | WO 2012/160270 A1 | 11/2012 |
| WO | WO 2013/030467 A1 | 3/2013 |
| WO | WO 2013/072583 A2 | 5/2013 |
| WO | WO 2014/202845 A1 | 12/2014 |
| WO | WO 2015/018801 A1 | 2/2015 |
| WO | WO 2018/060559 A1 | 4/2018 |

OTHER PUBLICATIONS

Search Report for PCT Application No. PCT/FR2016/000043, dated Jul. 19, 2016, 7 pages.
Written Opinion for PCT Application No. PCT/FR2016/000043, dated Sep. 28, 2017, 8 pages.
Search Report dated Jul. 2, 2010 for PCT Application No. PCT/EP2010/054377, 12 pages.
French Search Report dated Apr. 13, 2010 for French Application No. 09 54963, 7 pages.
French Search Report dated Apr. 15, 2010 for French Application No. 09 54964, 8 pages.
Evans, Don O., et al. "Fiber Placement Process Study," SAMPE 34.sup.th Symposium Book of Proceedings, May 8-11, 1989, 13 pages.
Search Report with English translation for PCT Application No. PCT/FR2016/000057, dated Jun. 20, 2016, 4 pages.
Written Opinion for PCT Application No. PCT/FR2016/000057, dated Oct. 12, 2017, 8 pages.
Search Report for PCT Application No. PCT/FR2017/000043, dated Jun. 26, 2016, 5 pages.
English translation of Search Report for PCT Application No. PCT/FR2017/000043, dated Jun. 26, 2016, 3 pages.
Written Opinion for PCT Application No. PCT/FR2017/000043, dated Jun. 26, 2016, 5 pages.
Search Report for PCT Application No. PCT/FR2017/000176, dated Jan. 16, 2018, 4 pages.
English translation for Search Report for PCT Application No. PCT/FR2017/000176, dated Jan. 16, 2018, 3 pages.
PCT International Search Report for PCT/FR2016/000165, dated Jan. 25, 2017, 4 pgs.
English translation of PCT International Search Report for PCT/FR2016/000165, dated Jan. 25, 2017, 2 pgs.
PCT Written Opinion of the ISA for PCT/FR2016/000165, dated Jan. 25, 2017, 6 pgs.
English translation of PCT Written Opinion of the ISA for PCT/FR2016/000165, dated Jan. 25, 2017, 6 pgs.
Application and File history for U.S. Appl. No. 14/898,535, filed Dec. 15, 2015. Inventors: Hamlyn et al.
Application and File history for U.S. Appl. No. 13/126,736, filed Aug. 2, 2011. Inventors: Hamlyn et al.
Application and File history for U.S. Appl. No. 14/119,139, filed Nov. 20, 2013. Inventors: Caffiau et al.
Search Report with English translation for PCT/FR2014/000135, dated Oct. 8, 2014, 4 pages.
Search Report for PCT/FR2009/064156, dated Feb. 1, 2010, 2 pages.
Search Report for French Application No. 1154449, dated Jan. 10, 2012, 2 pages.
Search Report for PCT/FR2009/000195, dated Oct. 24, 2012, 2 pages.

* cited by examiner

FIBER APPLICATION MACHINE COMPRISING SPECIFIC CUTTING SYSTEMS

RELATED CASES

The present application is a National Phase entry of PCT Application No. PCT/FR2016/000165, filed Oct. 13, 2016, which claims priority from FR Patent Application No. 15 02281 filed Oct. 28, 2015, which applications are hereby incorporated by reference in their entireties.

TECHNICAL FIELD

The present invention relates to a fiber-application machine and a method for producing parts made of composite material with such a machine. The invention more specifically relates to a fiber-application machine equipped with an application head equipped with specific cutting systems.

SUMMARY

It is known from fiber application machines for application on contact on a layup tool, such as a male or female mold, a wide strip formed from one or more continuous flat fibers, of tow type, dry or impregnated with thermosetting or thermoplastic resin, in particular carbon fibers, constituted of a multitude of carbon threads or filaments.

These fiber-application machines, also called fiber placement machines, conventionally comprise a fiber-application head, a movement system capable of moving the head, fiber-storage means for storing fibers, and conveying means for conveying fibers from the storage means up to the head. The head conventionally comprises an application roller for applying a strip formed of several fibers on an application surface, a guide system for guiding the fibers in the form of a strip towards said application roller, cutting systems for cutting fibers, as well as generally means for rerouting fibers and means for blocking fibers. Each cutting system conventionally comprises a blade capable of being maneuvered by a cutting cylinder between a rest position and an active position for cutting a fiber.

In certain cutting systems proposed, the blade in an active position abuts against a counter-tool for cutting the fiber, the counter-tool is, for example, formed of a bar made of elastomer material. This type of cutting proves to be satisfactory, but the number of cuts possible with such a blade can prove to be limited, in particular because of the quite quick wear and tear of the edge of the blade.

Other systems use a stationary blade or counter-blade, the fiber being cut by shearing while the blade moves in relation to the counter-blade. These cutting systems can enable a higher number of cuts before being replaced. However, the mounting of the blade and the counter-blade for an effective cut proves to be difficult, and the slightest gap between the blade and the counter-blade, in particular because of the wear and tear of the blade and/or counter-blade, considerably reduces the effectiveness of the cut and increases the clogging of the cutting system.

SUMMARY

The aim of the present invention is to propose a solution aiming to alleviate the above-mentioned disadvantages, and in particular to propose a new, simple and effective cutting system.

To this end, the embodiments of the present invention propose a fiber application machine for producing parts made of composite material comprising a fiber-application head comprising an application roller for applying a fiber or a strip formed of several fibers on an application surface, a guide system for guiding a fiber or several fibers in the form of a strip towards said application roller, and at least one cutting system comprising a blade capable of being maneuvered by a cutting cylinder between a rest position and an active position for cutting a fiber, characterized in that each cutting system comprises a counter-blade elastically held against the blade by the cutting ridge thereof, for cutting by shearing a fiber while the blade moves in relation to the counter-blade from the rest position thereof towards the active position thereof.

According to embodiments of the invention, the elastic mounting of the counter-blade against the blade by the cutting ridge thereof ensures an optimal position over time of the counter-blade in relation to the blade, and thus an effective cut. An optimal position between the blade and the counter-blade is kept, in particular in case of wear and tear of the counter-blade. Moreover, this elastic mounting enables the removal of the problems of the mounting gap between the blade and the counter-blade of the current systems.

According to an embodiment, the blade comprises an opening for the passage of a fiber, the opening defining a cutting edge of the blade.

According to an embodiment, the cutting edge is oriented towards the cutting cylinder, the counter-blade is arranged between the cutting edge of the blade and the cutting cylinder when the blade is in the rest position thereof, such that the cut is made by retracting the cylinder rod.

According to an embodiment, the counter-blade is mounted on a lever mounted pivoting around an axis, preferably perpendicular to the cylinder rod, the lever being applied elastically by a spring for elastically holding the counter-blade pressed against the blade.

According to an embodiment, the blade and the counter-blade form an angle of between 1° and 4° between them, preferably between 2° and 3°.

According to an embodiment, the blade and/or the counter-blade are equipped with micro-serrated teeth, for holding the fiber during the cut.

According to an embodiment, the blade and the counter-blade are mounted on one same support, the cutting system can thus be easily disassembled.

The present invention also aims for a method for producing parts made of composite material, comprising the layup of fibers on an application surface, characterized in that the layup is carried out by means of a fiber-application machine such as defined above.

The invention will be best understood, and other aims, details, characteristics and advantages more clearly during the detailed explanatory description which will follow a currently-preferred, specific embodiment of the invention, in reference to the appended schematic drawings, wherein:

DETAILED DESCRIPTION

Figure 1:
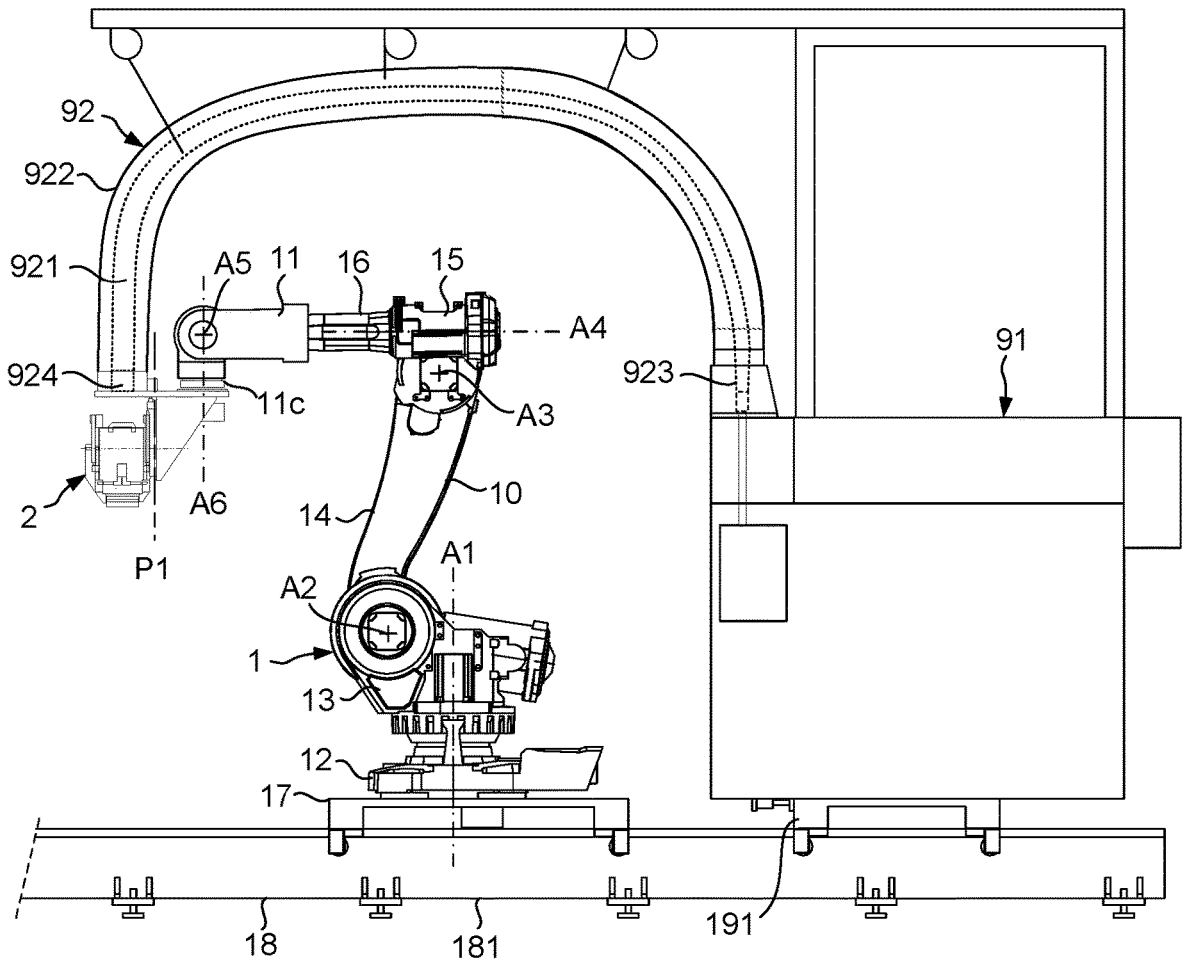
FIG. 1 is a schematic view of a fiber placement machine according to an embodiment of the invention.

In reference to FIG. 1, the placement machine comprises a movement system 1 formed of a poly-articulated arm 10, of the six-axis robot type, known per se, mounted mobile on a linear axis 18, an application head 2 mounted to the end wrist 11 of the poly-articulated arm, the storage means 91 for storing fibers, and the conveying means 92 for conveying fibers from the storage means towards the head.

The poly-articulated arm 10 comprises, in a manner known per se, a first section or baseplate 12, and a second, third, fourth and fifth sections, respectively 13, 14, 15 and 16, assembled pivoting to each other around rotation axes A1, A2, A3 and A4, and an end wrist 11 comprising the three last sections of the arm. In reference to FIG. 2, the end wrist 11 comprises a first section 11a by which the wrist is assembled on the sixth section 16 of the arm, such that the wrist is mounted rotating around the axis A4, a second section 11b mounted pivoting on the first section around an axis A5, and a third section 11c mounted pivoting on the second section around an axis A6, this third section, or assembly mainplate, being intended to support the head. The poly-articulated arm 10 is secured by the baseplate 12 thereof on a carriage 17 mounted sliding on the linear axis 18, the linear axis being constituted of two parallel rails 181 secured to the ground. The carriage is equipped with drive means, for example, motorized roller type, enslaved by a unit for controlling the machine for moving the head along these rails.

The machine is provided for applying fibers, for example, carbon fiber or tow type, packaged in the form of bobbins. The storage means are formed of a creel 91, for receiving the fiber bobbins. Each bobbin is mounted on a creel spindle. The creel here is mounted on a follower carriage 191, arranged on the rails 191 and mechanically connected to the carriage 17 supporting the robot.

The conveying means here comprise flexible conveying tubes equipped with flexible stiffening blades, such as defined in patent document WO2012/160270. The fibers are conveyed individually in these conveying tubes, from the creel to the head. The tubes are gathered into one cluster, represented schematically under references 921 in FIG. 1, and are placed in the inner passage of a flexible sleeve 922, such as defined in patent document WO2010/049424. The sleeve is assembled by the upstream end thereof and the downstream end thereof, respectively to the creel and to the application head. The tubes and the sleeve represent a sufficient length and a sufficient flexibility to not limit the movements of the poly-articulated arm. The conveying tubes are secured at the end, on the one hand to the creel 91 by the upstream securing systems, represented schematically under the reference 923, and on the other hand, to the head by the downstream securing systems, represented schematically under the reference 924, such as defined below.

The application head 2, also called fiber placement head, comprises a support structure or stationary part 21 by which the head is mounted to the end of the wrist 11 of the robot, and a mobile part 22 mounted mobile in translation on the stationary part 21 along a sliding plane P1.

Figure 2:
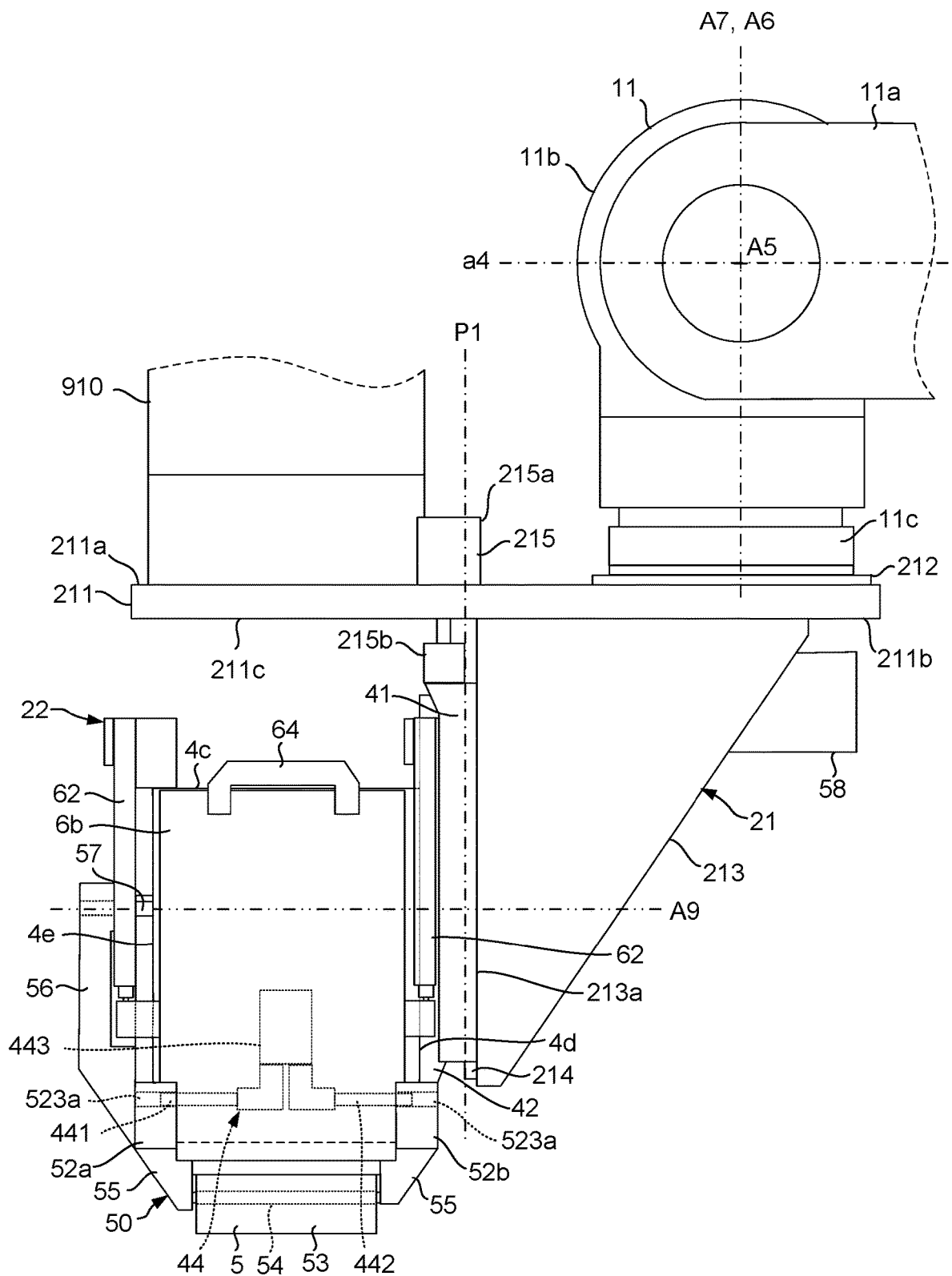
FIG. 2 is an enlarged partial view of FIG. 1 illustrating the fiber placement head from the side.
Figure 3:
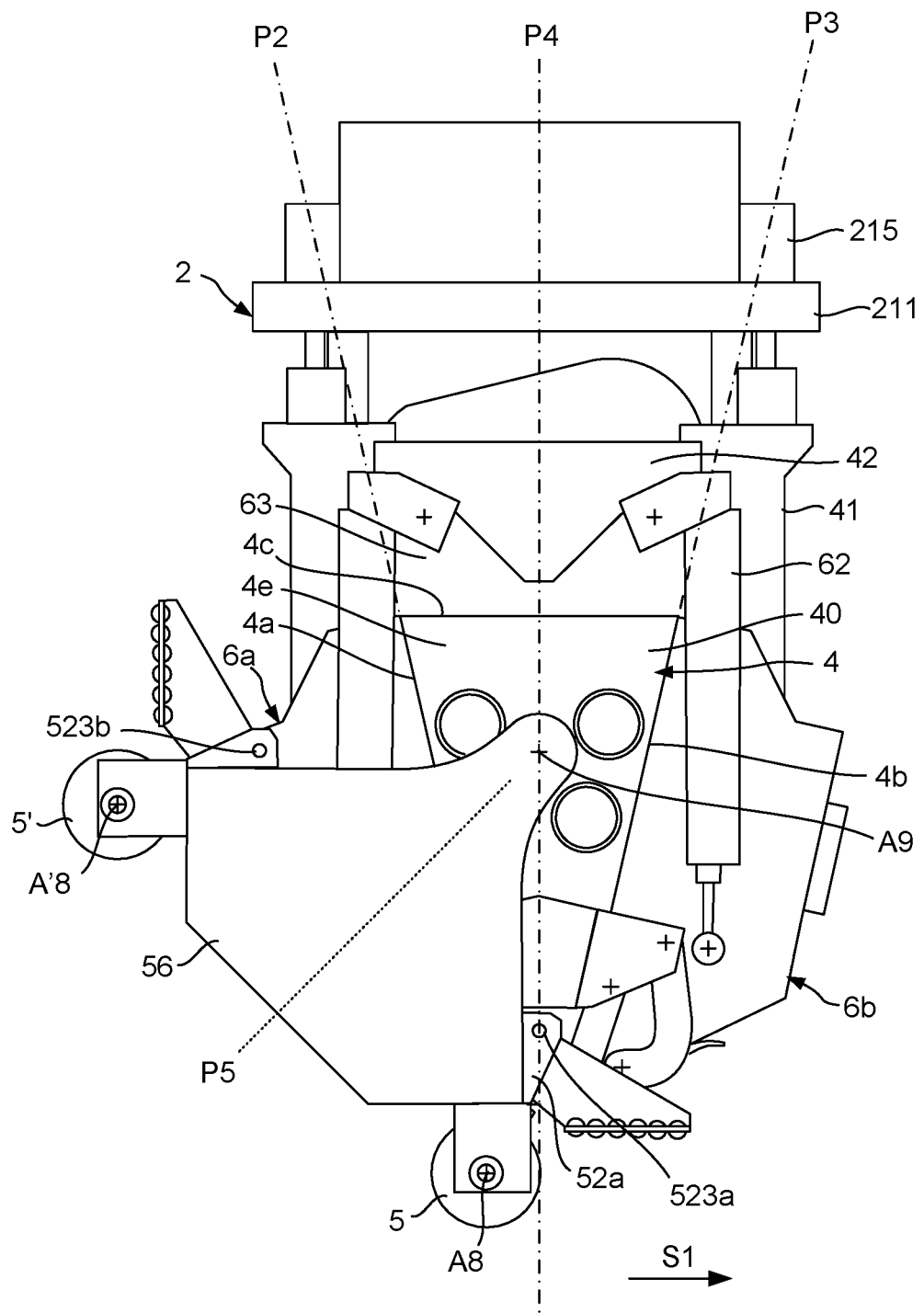
FIG. 3 is a front view of the head depicted in FIG. 2, with the first compacting roller in an active position.
Figure 4:
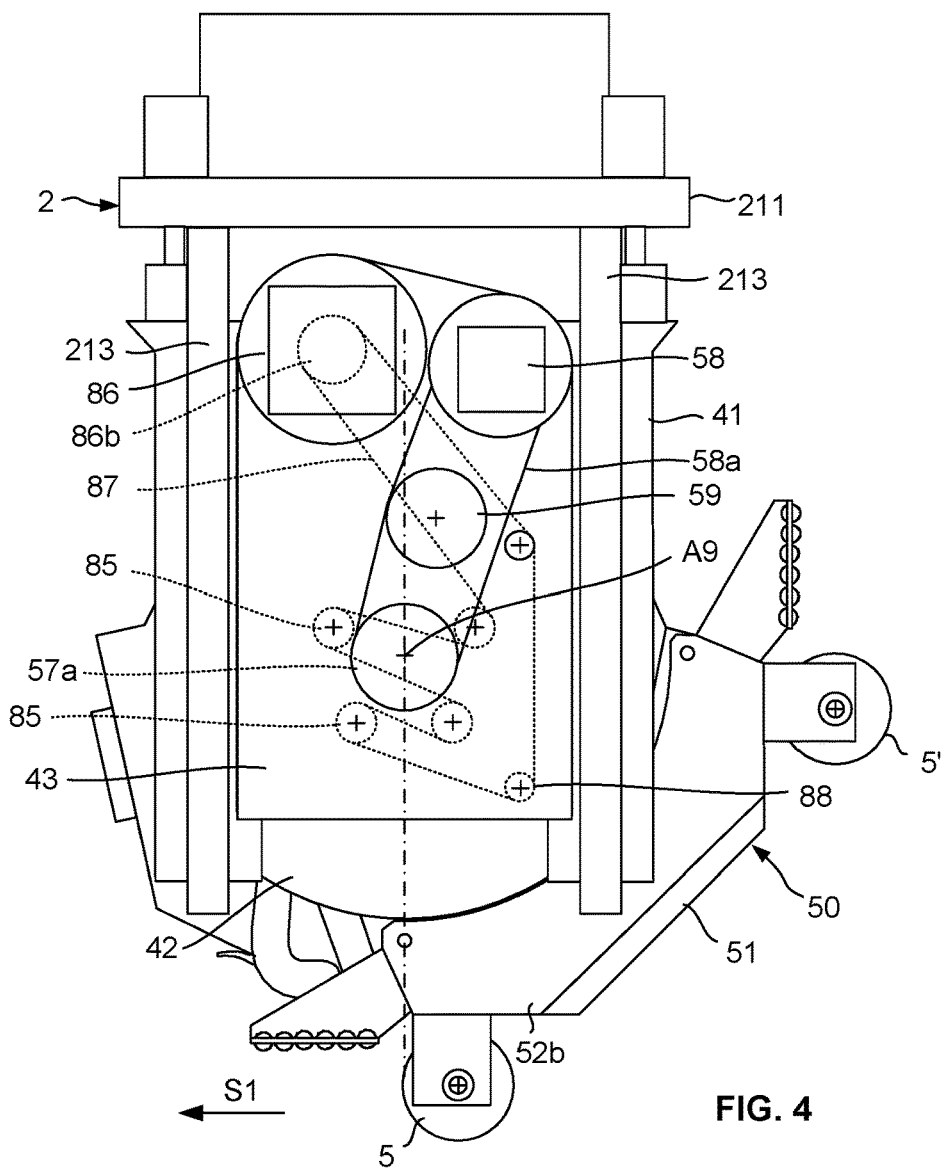
FIG. 4 is a rear view of the head depicted in FIG. 3.

In reference to FIGS. 2, 3 and 4, the stationary part 21 comprises a mainplate 211 having a main upper face 211a and a main lower face 211b. The mainplate is equipped on the upper face thereof with a connection system 212 enabling the connection thereof to the end of the wrist of the robot along an assembly axis A7 which corresponds to the sixth axis A6 of the robot. Two secured mounting plates 213 are mounted offset from each other on the lower face 211b of the mainplate for the slide mounting of the mobile part 22 along the plane P1, which is parallel to the axis A7.

The mobile part 22 mainly comprises a guide system 4, a compacting system, and two functional modules 6a, 6b, arranged on either side of the guide system, which integrates the fiber-cutting, blocking and rerouting functions. The compacting system is a two-roller system, of the type defined in patent document WO2014/202845, comprising a first roller 5 and a second roller 5', each roller can be moved between an inactive position and a layup active position, the head using either of the rollers in the active position for layup.

The guide system 4 enables the guiding of the fibers entering the head in the direction of a roller in an active position in the form of two bundles of fibers F1 and F2 (FIG. 12), to form a fiber strip wherein the fibers are arranged substantially edge-to-edge. The guide system 4 comprises a central part 40, wedge-shaped, of an overall triangular section, having a first and a second lateral face 4a, 4b defining two guide planes P2, P3, nearing each other from upstream to downstream, an upper face 4c opposite the roller in an active position, and a rear face 4d and a front face 4e substantially parallel. The first functional module 6a and the second functional module 6b are respectively placed flat through a main face 60a (FIG. 6) against the first and second main faces 4a, 4b of the central part, and forms at their mounting interface the first and second guide channels, respectively for guiding the fibers of the first bundle and of the second bundle.

Figure 12:
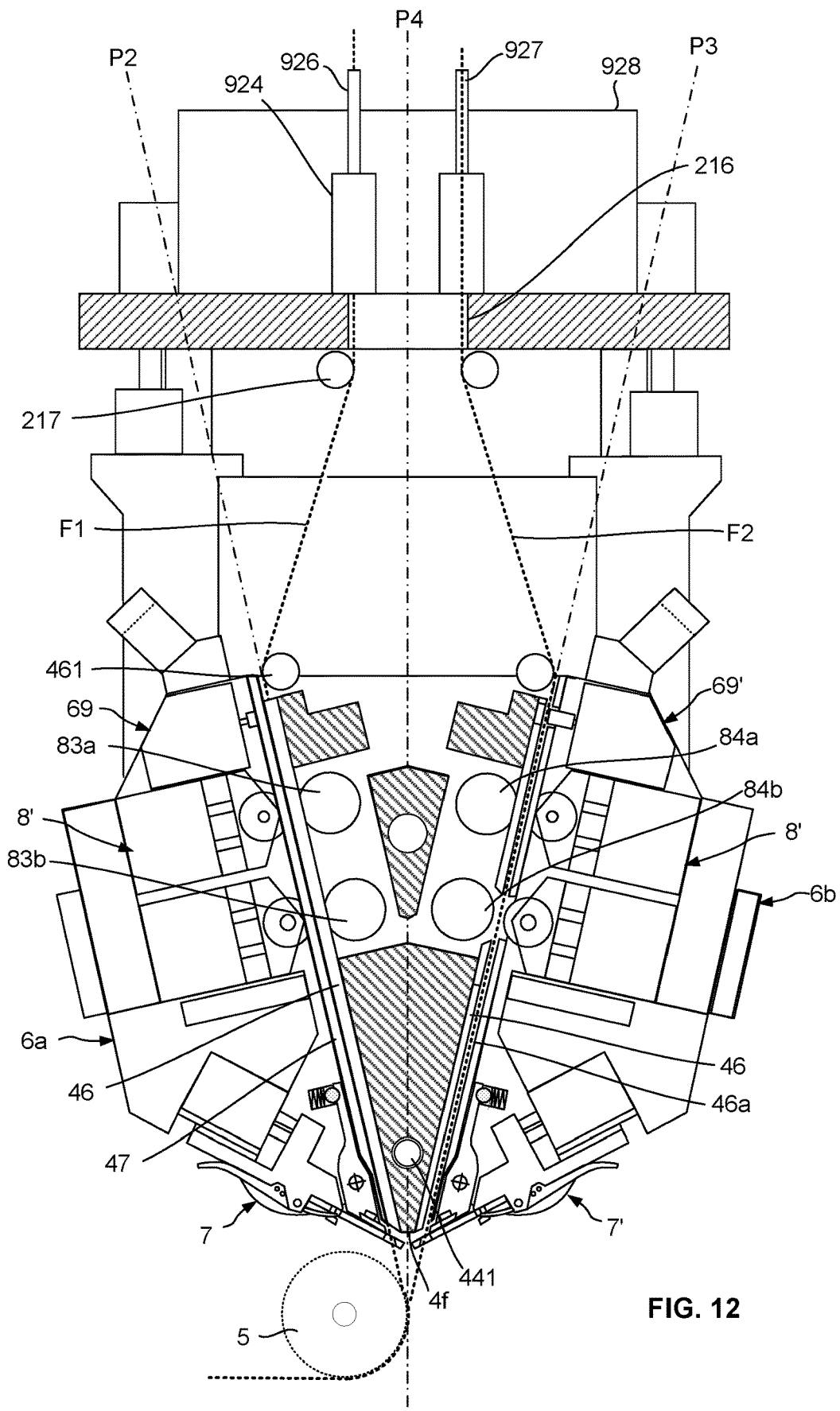
FIG. 12 is a schematic, partial, cross-section view of the head.

As an example, in reference to FIG. 12, each main face 4a, 4b of the central part is equipped with a guide plate 46, called inner grooved plate, equipped with grooves 46a, and each main face of a functional module is equipped with an outer guide plate 47, the outer guide plate being flat against the inner plate to close the grooves and thus form the guide channels. Preferably, the outer guide plate has ridges inserted in the grooves of the inner guide plate to form guide channels. The first channels and the second channels are arranged in staggered rows, along two guide planes P2, P3 nearing each other from upstream to downstream, such that the fibers F1 and F2 of the two bundles are substantially arranged edge-to-edge at the level of the application roller which is an in active position. The guide planes P2, P3 are arranged symmetrically on either side of the symmetrical median plane P4 of the guide system.

In the present embodiment, the head, for example, is provided for the application of twenty-four fiber strips, each bundle comprising 12 fibers, the main guide system comprising twelve first guide channels and twelve second guide channels.

The slide mounting of the mobile part 22 on the stationary part 21 is done via two support mounts 41, each mount being assembled sliding on the front edge 213a of a mounting plate. To do this, the front edge of each mounting plate is equipped with a rail 214, and each support mount 41 is equipped with two carriages (not represented) being mounted sliding on a rail. The central part 40 is assembled by the rear face 4d thereof to the front face of a first support plate 42 which is assembled to the two support mounts 41. The mounting is done such that the assembly axis A7 is contained in the median plane P4 of the guide system 4. The central part 40 is arranged on the side of the sliding plane which is opposite the assembly axis A7, the median plane P4 thereof being perpendicular to the sliding plane P1.

Each support mount 41 is connected to the mainplate 211 by a compacting cylinder 215, the cylinders defining the compacting force with which the fibers are applied on the mold via one of the rollers. Each cylinder 215 is mounted by the cylinder body 215a thereof on the mainplate 211, and the rod 215b thereof extends parallel to the sliding plane P1 and is assembled at the upper end of a support mount 41. The cylinders apply the mobile part in the direction opposite to the mainplate, that is vertically towards the bottom in the configuration in FIG. 2. The compacting cylinders, for example, of the pneumatic type, are pressure-controlled to adapt the compacting force.

Figure 5:
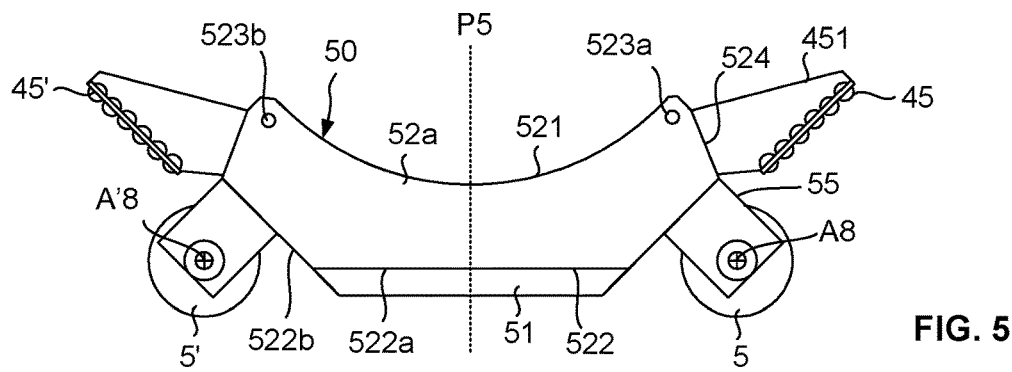
FIG. 5 is a schematic side view of the compacting system of the head comprising the support module supporting the two compacting rollers.

In reference to FIGS. 2 and 5, the two compacting rollers 5, 5' of the compacting system are mounted on one same support module 50. The support module 50 has a general U-shaped section with a base or central part 51 and two lateral bars or walls 52a, 52b. The base 51 has the form of a substantially rectangular plate. Each lateral wall 52a, 52b has the form of a plate with a concave upper edge 521 and a lower edge 522 having a straight-lined central portion 522a extending from each side by a straight-lined end portion 522b, arranged at 45° from the central portion, the two end portions being arranged symmetrically on either side of the symmetrical plane P5 of the support module and forming between them an angle of 90°. The base 52 is secured to the central portions 522a of the lower edges of the two lateral walls. The rollers 5, 5' are mounted between the two lateral walls, on the end portions 522b, around rotation axes A8, A8', the axes being arranged symmetrically on either side of the symmetrical plane P5. The two lateral walls are assembled firmly to the base. As an alternative, the lateral walls and the base are formed from one single one-piece part.

Each roller 5, 5' is, for example, a flexible roller comprising a cylinder made of elastomer material 53 mounted on a rigid axial rod 54. Each roller is mounted rotating around the rotation axis A8, A'8 thereof by the ends of the axial rod thereof between two assembly parts 55, for example, forming bearings, by which the roller is mounted removably via the assembly means to the two lateral walls 52a, 52b, at the level of the end portions 522b. The assembly means are, for example, of the pneumatic, magnetic or mechanical type.

The support module 50 is mounted rotating on the mobile part 22 of the head by means of an arm 56, mounted rotating on the front face of the central part around a pivoting axis A9 included in the plane P4, and assembled to the lateral wall 52a, called front, of the support module. The arm 56 is secured to the front end of an axial rod 57 (FIG. 2) mounted rotating on the central part 40. The lateral walls of the support module are arranged on either side of the central part, the rear lateral wall 52b passing under the lower convex edge of the first support plate 42. The arm is capable of pivoting around the pivoting axis A9 to move the support module between two positions, a first position of the support module, wherein the second roller is in an inactive position and the first roller 5 is in an active position for layup in a first direction 51, such as illustrated in FIG. 4, and a second position of the support module, wherein the first roller 5 is in an inactive position and the second roller 5' is in an active position for layup in a second direction S2, opposite the first direction.

The arm 56 is secured on a large part of the length of the front lateral wall of the support module, the section thereof being reduced in the direction of the pivoting axis thereof.

The support module is maneuvered between the two positions thereof by an actuation system comprising a motor 58 acting on the axial rod 57 of the arm. In reference to FIG. 4, the motor 58 is mounted, between the two mounting plates 213, on a second support plate 43 assembled on the rear edges of the two support mounts 41. The axial rod (FIG. 2) crosses the first and second support plate 42, 43 and the rear end thereof is equipped with a pinion 57a. The rotating drive of the axial rod is ensured by the motor 58 via a belt 58a mounted on a pinion of the drive shaft of the motor 58 and the pinion 57a of the rod, a tension idler 59 keeping the belt tense.

In the active position of the first roller illustrated in FIG. 3, the fibers exiting the guide system are guided towards the right side of the first roller 5 to enable the layup of the fibers with this first roller in the direction 51. The axis A8 of the first roller is positioned below the guide system, and to the left of the symmetrical plane P4. The plane P4 is, for example, substantially tangent to the cylindrical surface of the first roller in an active position. The second roller is in an inactive position. The end portions 522b of the lateral walls, which define the assembly planes of the assembly parts of the first roller, are arranged perpendicularly to the sliding plane, guaranteeing a strong recovery by the support module of the compacting forces transmitted by the roller. The second roller 5' is brought into an active position and the first roller in an inactive position by rotating the arm 90° around the axis A9, in the anticlockwise direction in FIG. 3, by means of the motor 58.

Figure 6:
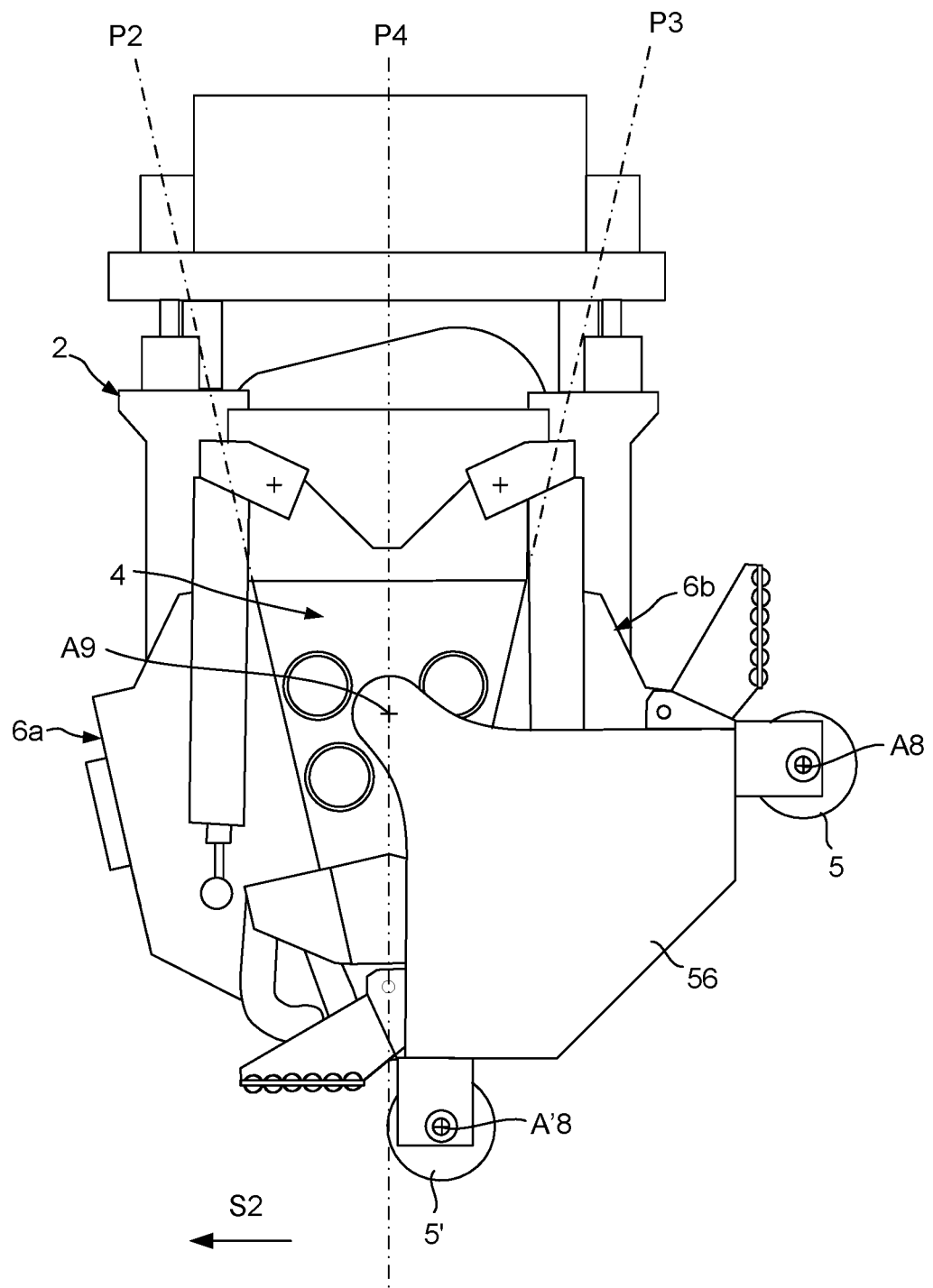
FIG. 6 is a view, similar to that in FIG. 3, the second compacting roller being in an active position.

In the active position of the second roller illustrated in FIG. 6, the fibers exiting the guide system are guided towards the left side of the second roller 5' to enable the layup of the fibers with this first roller in the direction S2. The axis A'8 of the second roller is positioned below the guide system, and to the right of the symmetrical plane P4. The plane P4 is substantially tangent to the cylindrical surface of the second roller in an active position. The end portions 522b of the lateral walls, which define the assembly planes of the assembly parts of the second roller, are arranged perpendicularly to the sliding plane, guaranteeing a strong recovery of the compacting forces by the support module. During the manoeuvre of the support module between the two positions thereof, the base of the support module passes under the downstream edge 4f of the central part.

The blocking means 44, illustrated schematically in FIG. 2, are provided to ensure the blocking of the support module in the first and second positions thereof. These blocking means comprise two blocking rods 441, 442, mounted sliding in the central part and of which the axes are arranged in the symmetrical plane P4. The blocking rods are capable of being maneuvered by an actuation system 443 between a retracted position wherein the blocking rods are arranged in the central part, away from the lateral walls of the support module, and a deployed active position wherein the blocking rods are protruding in relation to the front and rear faces 4d, 4e of the central part and are inserted in the recess or openings of the lateral walls of the support module to block the support module in rotation.

According to FIG. 5, the lateral walls 52a, 52b each have a first recess 523a and a second recess 523b arranged symmetrically on either side of the plane P5 and parallel to the latter. When the support module is arranged in the first position thereof, wherein the first roller is in an active position, the first recess is centred along the plane P4. The blocking rods are maneuvered towards their active position, a first blocking rod 441 is inserted in the first recess 523a of the front lateral wall 52a, and the second blocking rod 442 is inserted in the first recess 523a of the rear lateral wall 52b, such as illustrated in FIG. 2. The rods ensure the blocking in rotation of the support module in the first position thereof and thus guarantee the holding of the first roller in the active position thereof. Moreover, the blocking rods avoid the axial rod 57 from recovering all the compacting forces, and thus protect the axial rod and the motor 58. In the second position of the support module, the second recess 523b are centred along the plane P4, a first blocking rod 441 is inserted in the second recess 523b of the front lateral wall 52a, and the second blocking rod 442 is inserted in the second recess 523b of the rear lateral wall 52b. The actuation system 443 is, for example, a parallel clamp cylinder system, each rod 441, 442 being assembled to a clamp. Advantageously, the blocking studs have a conical end part being inserted in complementary cone-shaped first and second recess.

Each roller can advantageously be equipped with an additional guide system (not represented), such as defined in patent document WO2014/202845, to guide the fibers exiting the guide system 4 as close as possible to the roller. The additional guide system is, for example, mounted between the two assembly parts 55, the two additional guide systems being arranged symmetrically on either side of the plane P5, on the outer side of the rollers.

The support module is further equipped with a heating system capable of emitting heat radiation in the direction of the strip of fibers before they are compacted and/or in the direction of the mold or of the strips of fibers already applied upstream of the roller in an active position. This heating system enables to at least soften the pre-impregnation resin, in the case of pre-impregnated fibers, or the binder in the case of dry fibers, and thus favoring the adhesion of the strips to each other. The heating system comprises a first set of infrared lamps 45 connected to the first roller, which is used when the head lays up with the first roller in the first direction 51, and a second set of infrared lamps 45', connected to the second roller, which is used when the head lays up with the second roller in the second direction 51. The sets are assembled between two supports 451 which are mounted on the lateral edges 524 of the two lateral walls 52.

Figure 8:
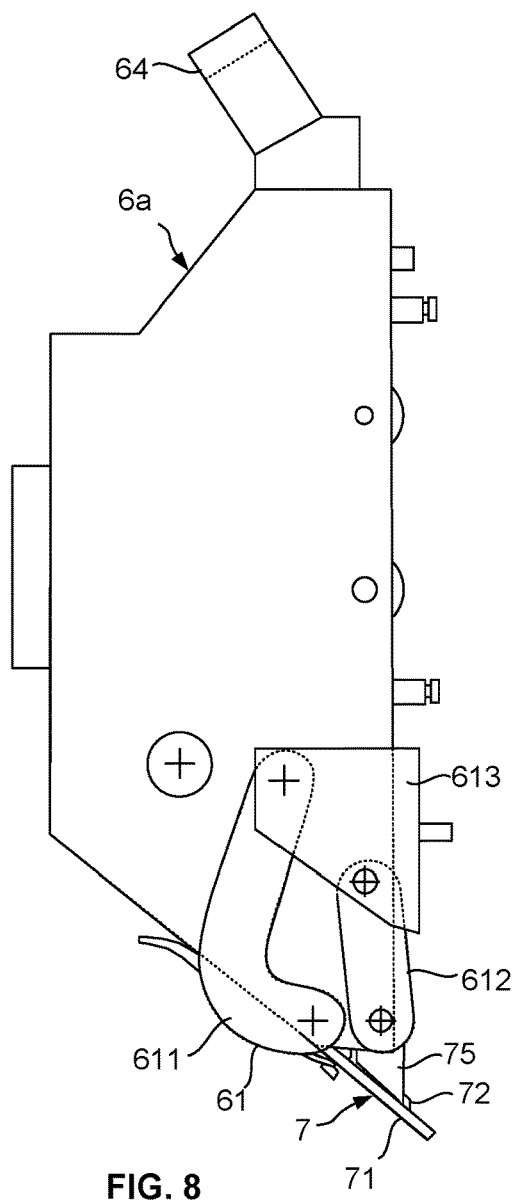
FIG. 8 is a side view of a functional module.
Figure 9:
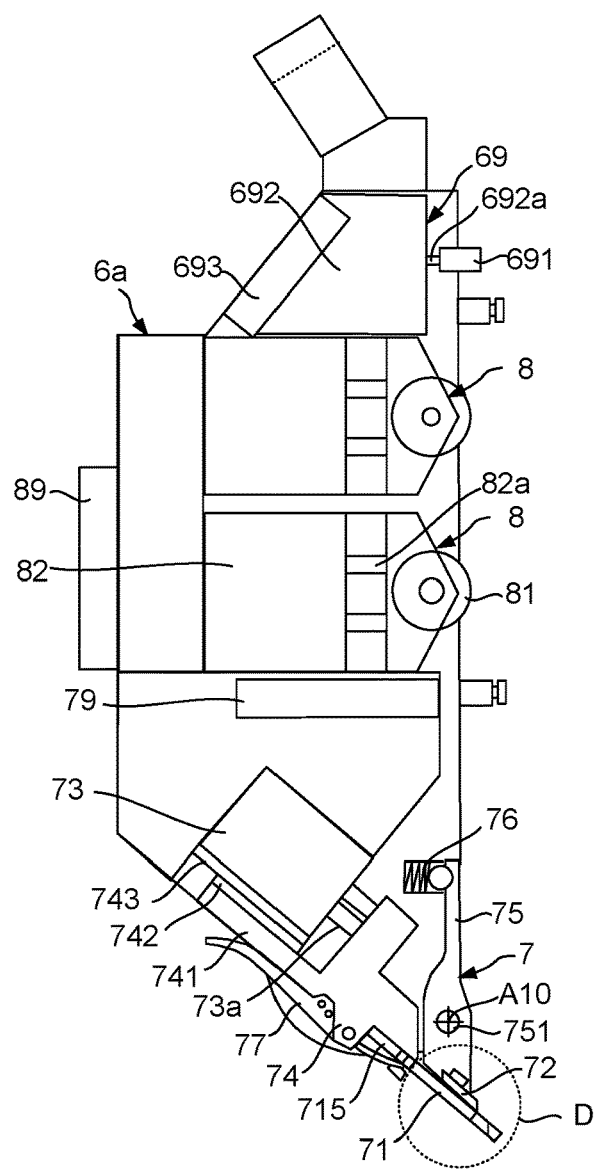
FIG. 9 is a schematic, cross-section view of the functional module depicted in FIG. 8.

In reference to FIGS. 8 and 9, the first functional module 6a comprises, for each fiber of the first bundle, a cutting system 7, a rerouting system 8, and a blocking system 69.

The functional module comprises support elements whereon are mounted the different components of the above-mentioned systems. The support module is mounted so that it can be moved on the central part via an articulation system 61 (FIG. 7) between a closed active position and an open position, called maintenance position, such as defined below.

Each cutting system 7 comprises a mobile metal blade 71, and a fixed metal blade, also called counter-blade 72, the blade 71 being maneuvered by a pneumatic cutting cylinder 73 between a deployed rest position and a cutting active position for cutting a fiber of the first bundle.

Figure 10:
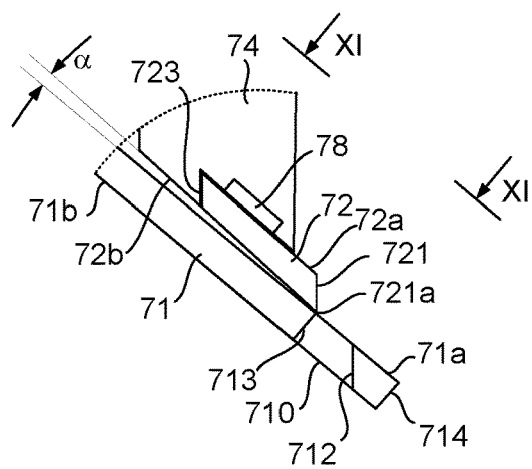
FIG. 10 is an enlarged view of the detail D in FIG. 9, illustrating the cutting system.
Figure 11:
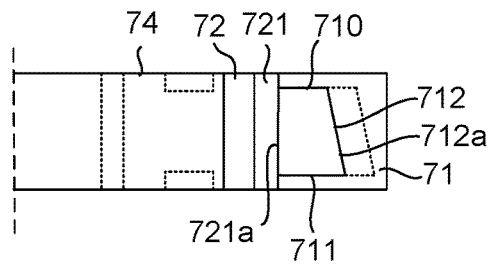
FIG. 11 is a view along the plane XI-XI in FIG. 10.

In reference to FIGS. 9, 10 and 11, the blade 71 is formed of a flat, rectangular plate having two main parallel faces, called inner face 71a, and outer face 71b. The blade is mounted secured, removably, cantilevered on a blade support 74 by the proximal mounting part 715 thereof, the blade support being assembled to the end of the rod 73a of the cutting cylinder 73. The blade is equipped, on the side of the distal end 714 thereof, with a crossing opening 710 for the passage of a fiber, leading to each main face. The opening forms two lateral edges 711, a front edge 712 opposite the cylinder, arranged on the side of the distal end 714, and a rear edge 713. The front edge is bevelled and constitutes the cutting edge of the blade, the bevel being formed on the side of the outer face 71b.

The counter-blade 72 is presented in the form of a flat, rectangular plate having a main inner face 72a, a main outer face 72b, and a front, bevelled edge, forming the cutting edge 721 of the counter-blade, the bevel being formed on the side of the inner face 72a. The width of the counter-blade substantially corresponds to that of the blade. The counter-blade is elastically mounted against the inner surface of the blade such that the counter-blade is linearly supported by the cutting ridge 721a thereof, also called blade edge or sharp edge, against the blade. For this mounting, a lever 75 is mounted pivoting on the functional module around an axis A10, the pivoting axis defining a first lever arm and a second lever arm. The counter-blade is mounted at the end of the first arm. A compression spring 76 mounted in a housing of the functional module acts on the second arm to apply the counter-blade supporting against the blade, the spring applying the lever in the clockwise direction in FIG. 9. The counter-blade forms an angle $\alpha$ with the blade, for example, around 2°.

In the deployed position illustrated in FIG. 9, the counter-blade is arranged against the blade such that the edge 721a thereof is positioned at the level of, or beyond the rear edge 713 in relation to the cutting edge 712, for example, at the level of said rear edge. The manoeuvre by the cutting cylinder of the blade from the deployed position thereof towards the retracted position thereof enables the cutting by shearing of a fiber passing into the opening. In the retracted position, the edge 721a of the counter-blade is positioned between the edge 712a of the blade and the distal end 714 of the blade. Such as is illustrated in FIG. 11, the cutting edge 712 of the blade is advantageously tilted to progressively cut the fiber and reduce the cutting force.

According to an alternative of an embodiment, the cutting edge 721 of the counter-blade is equipped with serrated edges, enabling holding of the fiber while cutting in order to avoid a lateral movement of the fiber while being cut.

To ensure a strong guiding of the forward movement of the blade between the two positions thereof, the support 74 has an arm 741 equipped with a slider 742 mounted sliding on a rail 743 secured to the bundle of the cylinder 73, parallel to the cylinder rod 73a.

The blade 71 is assembled removably on the blade support 74 by rapid locking means 77, such as clip-type locking levers.

The counter-blade 72 is assembled on the lever 75 via magnetic-type assembly means 78, such as a magnet housed in the lever arm. The counter-blade advantageously has indentations wherein lugs of the lever arm are positioned, in order to ensure a strong positioning of the counter-blade on the lever. According to another embodiment, the counterblade is assembled by mechanical-type assembly means, for example, by means of one or more screws. The counter-blade advantageously has a second cutting edge 723 on the edge thereof opposite to the first cutting edge 721. The counter-blade can thus be mounted in the reverse direction on the lever to use this second cutting edge when the first cutting edge is worn.

The cutting systems are mounted side-by-side on the first functional module, a cutting system being provided for each fiber of the first bundle. The levers 75 of the cutting system are mounted rotating independently from each other on one same axial rod 751, each lever being biased by its own spring.

In the closed active position of the functional module illustrated in particular in FIG. 12, the openings 710 of the blades are arranged under the central part 40 under the downstream edge 4f, opposite the guide channels. The cutting cylinder rods which are parallel to the cutting blades, form an angle less than 90° in relation to the guide plane P2, for example, around 45°.

Each rerouting system 8 of the first functional module comprises a counter-idler 81 mounted free in rotation at the end of the rod 82a of a pneumatic rerouting cylinder 82 via a tread. The cylinder is capable of moving the counter-idler between an offset inactive position and an active position wherein the counter-idler flattens a fiber against a first drive roller mounted on the central part 40. In reference to FIG. 12, the counter-idlers of the functional module are mounted upstream of the cutting systems in relation to the scrolling direction of the fibers, each counter-idler being centred along a guide channel of the first bundle in the closed position of the functional module. For reasons of encumbrance the counter-idlers, the counter-idlers here are arranged in two superimposed rows, such that the cylinder rods are arranged substantially perpendicularly to the guide plane P2. The counter-idlers of a first row cooperate with a first drive roller 83a, the counter-idlers of the second row, arranged between the first row and the cutting systems, cooperate with another first drive roller 83b. The counter-idlers and the drive rollers 83a, 83b are arranged at the level of crossing openings respectively of the outer guide plate and the inner guide plate. A counter-idler is provided for each fiber of the first bundle, two adjacent fibers of the first bundle being rerouted by the counter-idlers of different rows.

Each blocking system 69 comprises a blocking stud 691 mounted at the end of the rod 692a of a blocking cylinder 692. The stud has a cylindrical distal part, defining a flat supporting surface perpendicular to the cylinder rod. The stud passes into an opening of the outer guide plate. The functional module comprises a blocking system for each fiber of the first bundle. The blocking systems are arranged side-by-side in a row, upstream of the rerouting systems, so as the rods are centred along the first channels, substantially perpendicularly to the first guide plane P2. The cylinder is capable of moving the stud between an inactive position and an active position to block a fiber. In an inactive position, the stud is offset from the guide channel to which it is connected. During the movement thereof towards the active position, the stud abuts by the supporting surface thereof against a counter-tool and clamps the fiber. The counter-tools of the blocking systems are formed, for example, of one same metal bar housed in a recess of the inner guide plate.

The second functional module 6b for the second bundle of fibers F2 is identical to the first functional module, and comprises, in reference to FIG. 12, cutting systems 7', rerouting system 8' and blocking systems 69'. In the closed active position thereof, the second functional module is placed flat by the main surface thereof against the second lateral face 4a of the central part. The central part is equipped with two drive rollers 84a, 84b to cooperate with the rerouting counter-idlers of the rerouting systems of the second functional module. The first and second rollers are positioned symmetrically on either side of the plane P4. The four drive rollers 83a, 83b, 84a, 84b are rotated via a belt by one single motor. The drive rollers are mounted rotating in the bores of the central part around rotation axes parallel to the plane P4. The drive rollers are mounted on the central part 40, dismountably, by the front face 4e of the central part. The rear end of each roller crosses the first support plate 42 and is equipped with coupling means capable of cooperating with the additional coupling means mounted on a pinion 85 mounted rotating on the second support plate 43. These coupling means enable an automatic coupling, substantially without a gap, of each drive roller with the connected pinion thereof, when the drive roller is inserted in the central part by the front face. In reference to FIG. 4, the four pinions 85 of the rerouting rollers are arranged between the first support plate 42 and the second support plate 43. A rerouting motor 86 is mounted on the rear face of the second support plate, the drive shaft thereof crossing said second plate and being equipped with a pinion 86b. A toothed belt 87 is mounted on the pinion 86b of the motor, the four pinions 85, as well as on the return pulleys 88, such that, in reference to the arrangement in FIG. 7, the first drive rollers 83a, 83b for the first functional module are rotated in the anticlockwise direction, and the second drive rollers 84a, 84b for the second functional module are rotated in the clockwise direction. The drive motor 86 is controlled by the control unit of the machine to drive the rollers, for example, such that the peripheral speed of said rollers corresponds to the speed of the tool central point, or TCP, defined as being the middle of the intersection line between the surface of the compacting roller in an active position and the layup surface.

To access the front ends of the first rollers, and in particular to release the arm 56, the mobile support is brought into the second position thereof. The mobile support is brought into the first position thereof to access the second drive rollers.

Each functional module is mounted movably on the central part via two articulation systems 61, a first articulation system is mounted between a first front lateral face of the functional module and the front face 4e of the central part, the second articulation system being mounted between the second lateral face of the functional module and the rear face 4d of the central part. In reference to FIGS. 7 and 8, each articulation system is of the type with combined rotation and translation movements, comprising a dual-rod system, the rods 611, 612 being assembled pivoting on one side to a lateral face of the module, and on the other side to an assembly part 613 which is assembled dismountably to one additional assembly part 614 mounted on one of the front and rear faces of the main part.

Figure 7:
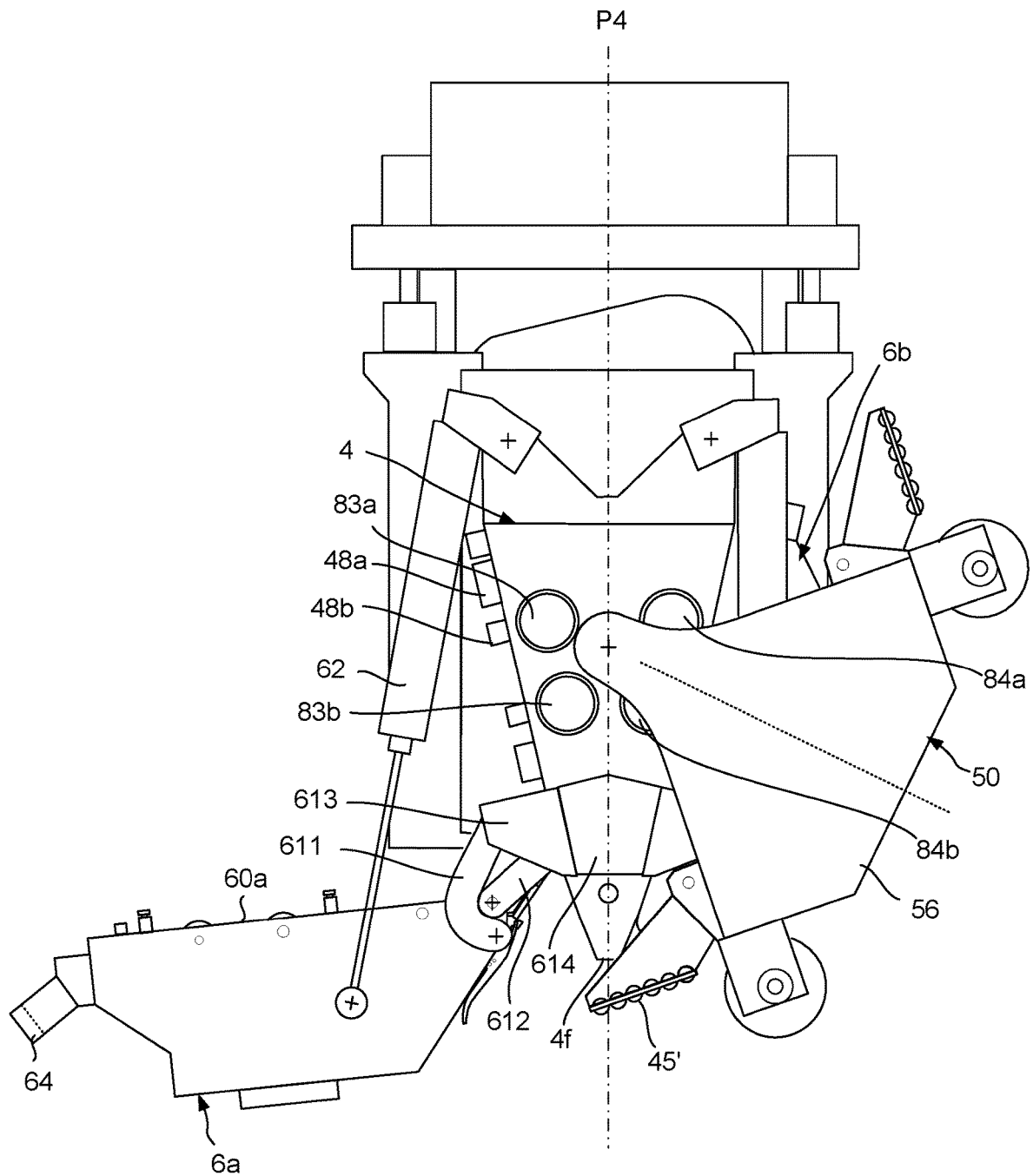
FIG. 7 is a view, similar to that in FIG. 3, the support module of the two compacting rollers in a first maintenance position, the first functional module of the head in an open position.

The articulation systems enable the manoeuvring of the module between a closed active position, such as illustrated, for example, in FIGS. 6 and 12, wherein the main face 60a equipped with the outer guide plate is flattened against the lateral face of the central part equipped with the inner guide plate thereof, and an open maintenance position illustrated in FIG. 7, wherein the main face 60a is offset from the central part, and is arranged at around 70-110° from the lateral face. In FIGS. 7 to 9, the first functional module is represented without the outer guide plate thereof. The module is brought into an open maintenance position to carry out maintenance operations on the functional module, as well as on the guide plate and/or the drive rollers.

For each functional module, the cutting cylinders 73, the rerouting cylinders 82 and the blocking cylinders 692 are connected to solenoid valve-formed pneumatic distributors, represented schematically under references 79, 89 and 693, mounted on the functional module, and enslaved by a control unit of the head. The pneumatic supply of the cylinders is achieved when the module is in a closed position. The inputs and outputs of the solenoid valves are connected by ducts (not represented), respectively to the cylinder chambers and to the connection systems arranged on the main face of the module, on either side of the counter-idlers and the blocking studs. When the module is in a closed position, these connection systems are capable of being connected sealed to the additional connection systems 48a, 48b arranged on the main face of the central part and connected to the compressed air supply ducts. During the closure of the module, the articulation systems ensure a final translation movement enabling the pneumatic connection.

Each functional module can further be equipped on the main thereof or on the high part of the module with an electrical connection system capable of cooperating with the additional electrical connection systems on the central part for an automatic electrical connection of the solenoid valves, as well as other possible equipment mounted on the module, when the functional module is brought into a closed position.

To facilitate the manoeuvring of each functional module between the two positions thereof, two assistance cylinders 62 are mounted pivoting between the central part 40 and the functional module. On the side of the central part, the cylinder is mounted pivoting by the cylinder bundle thereof to a support plate 63 mounted on the upper face of the central part. Moreover, each functional module is advantageously equipped with a handle 64 to facilitate the manoeuvring thereof between the two positions thereof. The blocking means are provided to block each module in the closed position thereof.

To offset the second set of infrared lamps 45' and enable the manoeuvring of the functional module towards the open position thereof, the mobile support 50 is moved beforehand towards a first maintenance position illustrated in FIG. 6, wherein the support module is further offset towards the right, the arm additionally rotating in the anticlockwise direction, for example, around 15-30° in relation to the second position of the module wherein the second roller is in an active position. The support module can also be moved into a second maintenance position, wherein the support module is arranged on the side of the first functional module, in a symmetrical position to that of the support module in a first maintenance position. The support module 50 is brought into this second maintenance position to carry out maintenance operations on the second functional module in an open position, as well as on the guide plate and/or the drive rollers. According to another embodiment, the sets of infrared lamps 45, 45' are mounted pivoting the functional modules, around an axis by entering an active position illustrated in the figures and an offset position, wherein the lamps are offset from the central part to enable the manoeuvring of the functional modules between their two positions when the support module is in the first and second positions thereof. Each set of lamps I is, for example, mounted pivoting on a lateral edge 524 of the front lateral wall 52a around an axis parallel to said lateral edge.

In reference to FIGS. 2 and 12, the mainplate has a part 211c extending beyond the sliding plane P1, above the mobile part 22 of the head. The conveying tubes 926, 927 are mounted via the downstream securing systems 925, for example, in the form of cassettes, on the upper face 211a of this mainplate part 211c, in two rows parallel to the plane P4, a first row of tubes 926 to bring the fibers F1 of the first bundle into the head, and a second row of tubes 927 to bring the fibers F2 of the second bundle into the head. The sleeve 922 is secured at the end to a cylindrical mounting part 928 which is secured on the upper face of the mainplate. Exiting the tubes, each fiber passes into a central opening 216 of the mainplate, then over two idlers in order to be offset from the plane P4 and to be guided into the guide channels along the planes P1 and P2. Each fiber passes over a first idler 217 mounted rotating on the mainplate, under the lower face of the latter, then over a second idler 461 mounted on the central part 40 to orient the fiber into the guide channel thereof. A pair of first and second idlers is provided for each fiber. Advantageously, the idlers 461 for a fiber bundle are mounted on a support secured to the inner guide plate associated to the bundle.

The first module and the second module are identical and interchangeable. For calibration operations of the cutting, rerouting and blocking system, each functional module can be disassembled from the head, and mounted on a calibration bench.

The lower guide plates advantageously comprise two transverse bars, one arranged on the upper part and the other on the lower part, to hold the fibers on the plates when the functional modules are brought into an open position, and to ensure the right positioning of the fibers during the closure of the functional modules.

According to an alternative of an embodiment, to guarantee the precision and the robustness of the pivoting mounting of the support module, a second curved arm is assembled to the rear lateral wall 525 of the support module, the second arm is curved to avoid the mounting plates 213 and to be mounted on the rear end of the axial rod 57.

The machine comprises a control unit (not represented) to control the movements of the robot according to programmed sequences, as well as the fiber placement head, in particular, the solenoid valves of the cutting cylinder, rerouting cylinders, and blocking cylinders, the cylinder for controlling the rods 441, 442 for blocking the support module, the drive roller motor, and the motor for the pivoting of the support module.

Although the invention has been described in line with a specific embodiment, of course it is not at all limited to that, and it comprises all the technical equivalents of the means defined, as well as their combinations if they fall under the scope of the invention.

The invention claimed is:

1. A fiber-application machine for producing parts made of composite material comprising a fiber-application head comprising
    an application roller,
    a guide system for guiding one fiber or several fibers in the form of a strip towards said application roller, and
    at least one cutting system comprising a blade capable of being maneuvered by a cutting cylinder between a rest position and an active position for cutting a fiber,
    each cutting system comprising a counter-blade presenting a cutting ridge, the cutting system including a mount pivotally supporting the counterblade at an angle relative to the blade and elastically biasing the counterblade against the blade along the cutting ridge of the counterblade, the cutting system adapted, for cutting by shearing a fiber while the blade moves from the rest position thereof towards the active position thereof, and wherein the counter-blade is mounted on a lever, the lever being mounted about a pivot axis, and the lever being elastically applied by a spring to hold the counter-blade pressed against the blade.

2. The machine according to claim 1, wherein the blade comprises an opening for the passage of a fiber, said opening defining a cutting edge.

3. The machine according to claim 2, wherein the counter-blade is arranged between the cutting edge of the blade and the cutting cylinder when the blade is in the rest position thereof, such that the cut is made by retracting the cylinder rod.

4. The machine according to claim 1, wherein the blade and the counter-blade form an angle ($\alpha$) of between 1° and 4° between them, preferably between 2° and 3°.

5. The machine according to claim 4, said angle ($\alpha$) being between 2° and 3°.

6. The machine according to claim 1, wherein the blade and/or the counter-blade are equipped with micro-serrated teeth.

7. The machine according to claim 1 wherein the blade and the counter-blade are mounted on one same support.

8. A method for producing parts made of composite material, comprising the layup of fibers over an application surface, wherein said layup is carried out by means of a fiber-application machine according to claim 1.

\* \* \* \* \*